United States Patent [19]

Bowen et al.

[11] 3,806,664

[45] Apr. 23, 1974

[54] TONE RECEIVER WITH DETECTION OF EACH TONE IN A PRECISE FREQUENCY BAND

[75] Inventors: Edward George Bowen, Laurence Harbor; George Wilmer Dick, Colts Neck, both of N.J.

[73] Assignee: Bell Telephone Laboratories, Incorporated, Murray Hill, N.J.

[22] Filed: Sept. 13, 1972

[21] Appl. No.: 288,506

[52] U.S. Cl. .......................... 179/84 VF, 340/171 R
[51] Int. Cl. ............................................ H04m 1/00
[58] Field of Search............. 179/84 VF; 340/171 R; 328/116, 117, 147, 150; 325/346

[56] References Cited

UNITED STATES PATENTS

| | | | |
|---|---|---|---|
| 3,701,103 | 10/1972 | Padgett | 340/171 R |
| 3,405,234 | 10/1968 | West | 340/171 R |
| 3,082,405 | 3/1963 | Hanak | 340/171 R |
| 3,663,885 | 5/1972 | Stewart | 328/140 |
| 3,603,740 | 9/1971 | Cambridge | 178/84 VF |

*Primary Examiner*—Kathleen H. Claffy
*Assistant Examiner*—Jon Bradford Leaheey
*Attorney, Agent, or Firm*—J. P. Kearns

[57] ABSTRACT

A receiver for detecting the presence of each of a predetermined group of tones comprising a frequency-to-voltage converter, a plurality of reference-voltage sources and a voltage sensor. The frequency-to-voltage converter converts each tone of a multifrequency input signal to a unique amplitude of its output voltage signal. The voltage sensor compares the voltage signal from the frequency-to-voltage converter to the plurality reference voltages. Logic outputs from the voltage detector indicate the presence in the voltage signal of amplitudes within predetermined ranges of each reference voltage and hence corresponding discrete tones for each input signal. The tone frequencies which can be detected and the detection bandwidth for each are independently adjusted with a pair of potentiometers.

7 Claims, 3 Drawing Figures

TONE RECEIVER WITH DETECTION OF EACH TONE IN A PRECISE FREQUENCY BAND

This invention relates generally to the detection of tones and more specifically to apparatus capable of detecting the presence of each of a predetermined group of tones within a communications signal.

BACKGROUND OF THE INVENTION

It is a common practice in communications systems to transmit predetermined tones within the spectrum of information signals for the purpose of performing ancillary functions such as control and synchronization. At the receiver, the detection of each tone usually requires a separate sharply tuned bandpass filter. The primary disadvantage of this method of tone detection is that sharply tuned bandpass filters tend to be bulky as well as expensive.

It is, therefore, an object of this invention to provide a highly selective tone detector that does not require the use of sharply tuned bandpass filters.

It is a further object of this invention to provide apparatus employing a single frequency-dependent element that will detect the presence in its input signal of each of a predetermined group of tones.

SUMMARY OF THE INVENTION

According to this invention a received communications signal, including any one of a predetermined group of tones, is applied to a frequency-to-voltage converter which linearly converts any tone in the input signal to a unique amplitude of its output voltage signal. The voltage signal is applied to a voltage detector which compares the voltage signal to a set of reference voltages corresponding to the tones to be detected. If the voltage signal amplitude is within some predetermined range of any reference voltage, the voltage detector produces a logic output indicating the presence of the corresponding tone. The reference voltages are readily produced by means of a resistor reference circuit in which the values of the specific reference voltages and the detection range for each are varied by means of variable resistors.

It is a feature of this invention that high frequency selectivity can be obtained in detecting tones without the use of sharply tuned bandpass filters.

It is another feature of this invention that only one frequency-to-voltage converter is needed to detect any of a plurality of tones.

Another feature of this invention is that the detectable frequencies and the selectivity of the detector are modified by simple adjustments of variable resistors.

BRIEF DESCRIPTION OF THE DRAWING

The foregoing and other objects and features of this invention will be more fully understood from the following description of the illustrative embodiment taken in conjunction with the accompanying drawing in which.

DETAILED DESCRIPTION

Figure 1:
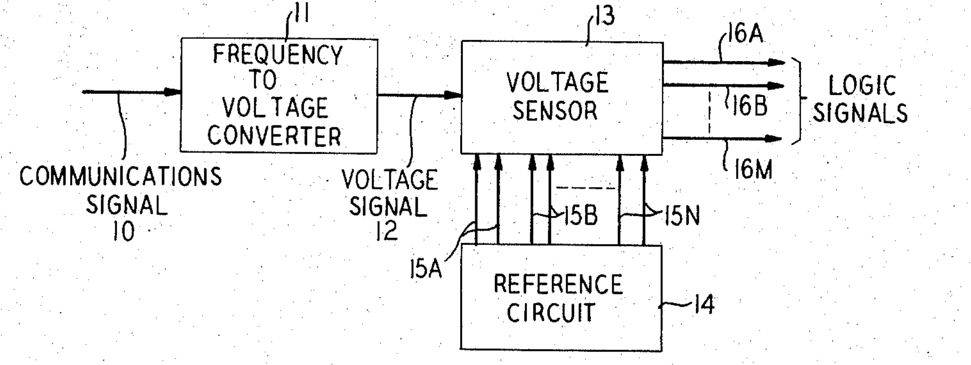
FIG. 1 is a block diagram showing the structure of the tone detector according to this invention.

The invention is characterized by the block diagram of FIG. 1. An incoming communications signal including any one of a specific group of tones is applied to frequency-to-voltage converter 11 through lead 10. Frequency-to-voltage converter 11 produces a voltage signal on line 12 in which every frequency in some predetermined bandwidth is represented by a unique voltage amplitude. Thus, a tone in the communications signal produces a corresponding voltage amplitude in the voltage signal which persists for the duration of the tone. Reference circuit 14 produces a plurality of reference voltage pairs on line pairs 15A–15N. each pair of reference voltages straddles a voltage amplitude corresponding to a detectable tone. Lines 12 and 15A–15N are all applied to voltage sensor 13 which determines whether the voltage signal lies between some reference voltage pair and produces a plurality of output signals on lines 16A–16M. These logic signals may indicate that the amplitude of the voltage signal on line 12 lies within the range of a particular reference voltage pair which means that the corresponding tone is present. In the alternative, these logic signals may indicate that no tone is present. In a practical system, the logic signals may advantageously be monitored in order to assure that they maintain their state for some predetermined minimum time interval. Such a hold feature guards against tone bursts, transients in the communication signal, and detection of noise as a valid tone.

Figures 2, 3:
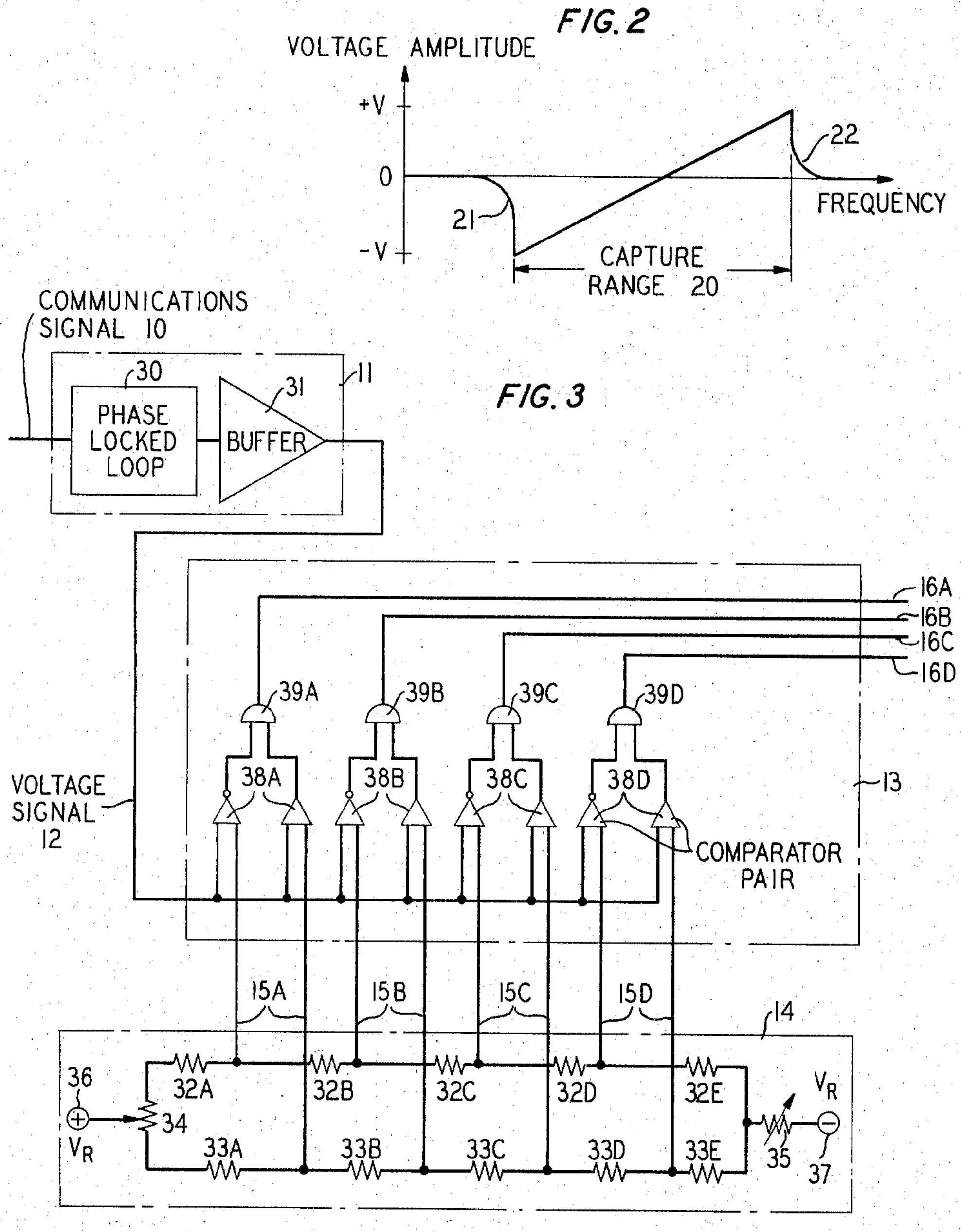
FIG. 2 illustrates the voltage vs. frequency characteristic of a phase-locked loop.
FIG. 3 is a schematic diagram of a tone detector useful in a system where tones other than those used for signaling are forbidden in the communications signal.

The graph of FIG. 2 represents the voltage amplitude vs. frequency characteristic of a phase-locked loop. When the frequency of the input signal is within capture range 20 of the phase-locked loop, the loop will assume the frequency of the input signal and produce a voltage signal having an amplitude proportional to the frequency of the input signal. The loop will also follow frequency variations within and slightly beyond its capture range. This total range of operation is called the lock range. Outside of the lock range, the phase-locked loop cannot reliably respond to the frequency of the input signal. Nevertheless, there are two transition frequency ranges 21 and 22 in which input signals can produce output voltages. Although the output voltages produced under these circumstances are at the same level as those produced within the capture range, they are of short duration because the loop doesn't lock on them. These spurious voltages simply appear as transients in the voltage signal output of the loop.

FIG. 3 illustrates an embodiment of the invention useful where the communications signal includes no discrete tones in the range used for signaling purposes other than the signaling tones themselves and where the signaling tones normally have a larger amplitude than that of any other signal energy simultaneously present. FIG. 3 is a detailed embodiment of FIG. 1 in which the elements of dashed boxes 11, 13 and 14 correspond respectively to frequency-to-voltage converter 11, voltage sensor 13, and reference circuit 14. Such an application frequently arises in key-pulse telephone signaling systems.

The communications signal including tones within the capture range of phase-locked loop 30 is applied to phase-locked loop 30 on line 10. Phase-locked loop 30 produces a voltage signal on line 12 through buffer amplifier 31. Two voltages $+V_R$ and $-V_R$ are applied at nodes 36 and 37, respectively, of reference circuit 14.

The wiper of potentiometer 34 is connected to node 36 and one side of variable resistor 35 is connected to node 37. Resistors 32 are serially connected between the top of potentiometer 34 and the free end of variable resistor 35, and resistors 33 are serially connected between the bottom of potentiometer 34 and the same end of variable resistor 35 to which resistors 32 are connected. Line 12 provides the voltage signal from buffer amplifier 31 to comparator pairs 38. The remaining inputs to each comparator pair are provided by line pairs 15, each connected to corresponding nodes on resistor strings 32 and 33. Each comparator pair comprises a normal comparator and an inverting comparator, (indicated by the small open circle at the output) the normal comparator indicating a true logic condition when the signal on line 12 exceeds the applied reference voltage and the inverting comparator indicating a true logic condition when the applied reference voltage exceeds the signal on line 12. The logic outputs from each of comparator pairs 38 are applied to one of AND gates 39 to produce logic output 16.

In operation, the communication signal is applied on line 10. Phase-locked loop 30 produces a voltage signal, as previously described, which is applied to line 12 through buffer amplifier 31. All comparator pairs receive this voltage signal and compare it to the reference voltages on line pairs 15. If the voltage signal is between the reference voltages applied to a comparator pair, both comparator outputs will be high and, therefore, the output of the associated AND gate will also be high. This indicates that the tone corresponding to that particular comparator pair was present in the communication signal. If the voltage signal does not lie between any reference voltage pair, all logic outputs will be low, indicating that none of the allowable tones was present in the communications signal.

The operation of voltage reference circuit 14 of FIG. 3 merits further dicussion. Corresponding resistors in resistor strings 32 and 33 shown within block 14 are equal. Thus, if potentiometer 34 is set at its midpoint, equal voltages are obtained on members of each pair 15, however, resistor 35 can be varied to produce different reference voltages on different line pairs 15 through voltage divider action. These reference voltages correspond to the tones which are to be detected. Now, if potentiometer 34 is varied from its midpoint, the voltage division in the two strings of resistors is different and different voltages appear on the lines corresponding to a particular pair of line pairs 15. These voltages straddle the voltage which appeared on that line pair before varying potentiometer 34. The operations of varying resistors 34 and 35 thus correspond, respectively, to changing the frequency of the detectable tone and changing the detection bandwidth for each tone.

Although a specific embodiment of this invention has been shown and described, it will be understood that various modifications may be made without departing from the spirit and scope of this invention.

What is claimed is:

1. A receiver for detecting the presence of any one of a group of tones in an applied multifrequency input signal comprising a frequency-to-voltage converter for linearly converting tones in said applied input signal to an amplitude of an output voltage signal in a predetermined amplitude range;

a plurality of reference voltage pairs; and a voltage sensor jointly responsive to said voltage signal and said reference voltage pairs for producing a plurality of logic output signals indicating when said voltage signal amplitude lies between the voltages in any of said reference voltage pairs.

2. The tone receiver in accordance with claim 1 in which the frequency-to-voltage converter comprises a phase-locked loop.

3. The tone receiver in accordance with claim 1 in which said reference voltage pairs are produced through voltage divider action from a first and second voltage standard, the difference and average between any pair being independently adjustable, the source of said reference voltage pairs comprising:

a potentiometer having its wiper arm connectible to said first voltage standard;

a variable resistor having one end connectible to said second voltage standard;

identical first and second pluralities of serially connected resistors of predetermined ratio therebetween and having respective outer terminals;

first and second junctions between one terminal of each of said pluralities of resistors and opposite ends of said potentiometer;

a common junction of the remaining terminals of each of said pluralities of resistors with free end of said variable resistor; and tapping points between individual resistors in each of said pluralities for providing said reference voltage pairs.

4. The tone receiver in accordance with claim 1 in which said voltage sensor comprises a plurality of comparator pairs, each comparator pair being responsive to said voltage signal and one of said reference voltage pairs to produce a pair of logic signals; and a plurality of logic gates, each gate being responsive to the logic signal pair from a particular comparator pair for producing a logic output signal which indicates whether the amplitude of said voltage signal lies between said reference voltage pair applied to the corresponding comparator pair.

5. A receiver for detecting the presence of any one of a group of tones in an applied multifrequency input signal comprising a phase-locked loop for linearly converting tones in said applied input signal to an amplitude of an output voltage signal in a predetermined amplitude range;

a plurality of reference voltage pairs; and a voltage sensor jointly responsive to said voltage signal and said reference voltage pairs for producing a plurality of logic output signals indicating when said voltage signal amplitude lies between the voltages in any of said reference voltage pairs.

6. The tone receiver in accordance with claim 5 in which said voltage sensor comprises a plurality of comparator pairs, each comparator pair being responsive to said voltage signal and one of said reference voltage pairs to produce a pair of logic signals; and a plurality of logic gates, each gate being responsive to the logic signal pair from a particular comparator pair for producing a logic output signal which indicates whether the amplitude of said voltage signal lies between said reference voltage pair applied to the corresponding comparator pair.

7. The tone receiver in accordance with claim 5 in which said reference voltage pairs are produced through voltage divider action from a first and second voltage standard, the difference and average between any pair being independently adjustable, the source of said reference voltage pairs comprising:

a potentiometer having its wiper arm connectible to said first voltage standard;

a variable resistor having one end connectible to said second voltage standard;

identical first and second pluralities of serially connected resistors of predetermined ratio therebetween and having respective outer terminals;

first and second junctions between one terminal of each of said pluralities of resistors and opposite ends of said potentiometer;

a common junction of the remaining terminals of each of said pluralities of resistors with free end of said variable resistor; and tapping points between individual resistors in each of said pluralities for providing said reference voltage pairs.

* * * * *